US009619463B2

(12) United States Patent
Ghosal et al.

(10) Patent No.: US 9,619,463 B2
(45) Date of Patent: Apr. 11, 2017

(54) DOCUMENT DECOMPOSITION INTO PARTS BASED UPON TRANSLATION COMPLEXITY FOR TRANSLATION ASSIGNMENT AND EXECUTION

(71) Applicant: International Business Machines Corporation, Armonk, NY (US)

(72) Inventors: Sugata Ghosal, New Delhi (IN); Raghavendra Singh, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 13/676,604

(22) Filed: Nov. 14, 2012

(65) Prior Publication Data

US 2014/0136181 A1 May 15, 2014

(51) Int. Cl.
   *G06F 17/28* (2006.01)
   *G06Q 10/06* (2012.01)

(52) U.S. Cl.
   CPC ...... *G06F 17/2836* (2013.01); *G06F 17/2854* (2013.01); *G06F 17/2809* (2013.01); *G06Q 10/063112* (2013.01)

(58) Field of Classification Search
   CPC .. G06F 17/28; G06F 17/2809; G06F 17/2854; G06Q 10/0631; G06Q 10/06311; G06Q 10/063112
   USPC .................. 704/1, 5, 7; 705/7.12, 7.13, 7.14
   See application file for complete search history.

(56) References Cited

U.S. PATENT DOCUMENTS

| 5,608,622 | A | * | 3/1997 | Church ............................ 704/3 |
| 6,208,956 | B1 | | 3/2001 | Motoyama |
| 6,285,978 | B1 | * | 9/2001 | Bernth ................ G06F 17/2854 704/2 |
| 6,393,389 | B1 | | 5/2002 | Chanod et al. |
| 6,993,473 | B2 | | 1/2006 | Cartus |
| 7,130,861 | B2 | * | 10/2006 | Bookman et al. |

(Continued)

OTHER PUBLICATIONS

Babych, et al. "Extending MT evaluation tools with translation complexity metrics." Proceedings of the 20th international conference on Computational Linguistics. Association for Computational Linguistics, Aug. 2004, pp. 1-7.*

(Continued)

*Primary Examiner* — James Wozniak
(74) *Attorney, Agent, or Firm* — Ryan, Mason & Lewis, LLP

(57) ABSTRACT

Techniques, a system and an article of manufacture for translation decomposition and execution. A method includes decomposing a document associated with a document translation request into two or more document parts based on meta-data of the document and content of the document, estimating translation complexity between a source language and a target language for each of the two or more document parts, classifying the two or more document parts based on the estimated translation complexity of each part and meta-data corresponding to each part, assigning each of the two or more document parts to a particular individual amongst a set of translators for translation based on the classification of each part and one or more variables associated with the set of translators, assembling each translation output for the two or more document parts to form a final output, and formatting the final output.

20 Claims, 2 Drawing Sheets

(56) References Cited

U.S. PATENT DOCUMENTS

| | | | |
|---|---|---|---|
| 8,050,906 B1* | 11/2011 | Zimmerman et al. | 704/2 |
| 8,145,472 B2 | 3/2012 | Shore et al. | |
| 2002/0111787 A1* | 8/2002 | Knyphausen et al. | 704/2 |
| 2007/0233461 A1* | 10/2007 | Fasciani | G06F 17/241 704/9 |
| 2008/0147378 A1* | 6/2008 | Hall | 704/4 |
| 2008/0177528 A1* | 7/2008 | Drewes | 704/2 |
| 2008/0183459 A1* | 7/2008 | Simonsen et al. | 704/1 |
| 2009/0119091 A1* | 5/2009 | Sarig | 704/2 |
| 2009/0204389 A1* | 8/2009 | Wang et al. | 704/7 |
| 2010/0241482 A1* | 9/2010 | Knyphausen et al. | 705/8 |
| 2011/0066469 A1* | 3/2011 | Kadosh | 705/9 |
| 2012/0136646 A1* | 5/2012 | Kraenzel et al. | 704/2 |
| 2012/0221320 A1* | 8/2012 | Yoshimura | 704/2 |
| 2012/0240039 A1* | 9/2012 | Walker et al. | 715/265 |
| 2013/0103381 A1* | 4/2013 | Assche | 704/2 |
| 2013/0124185 A1* | 5/2013 | Sarr et al. | 704/2 |
| 2014/0006003 A1* | 1/2014 | Soricut | G06F 17/2854 704/2 |
| 2014/0039870 A1* | 2/2014 | Roy et al. | 704/2 |

OTHER PUBLICATIONS

Chung, et al. "NARA: a two-way simultaneous interpretation system between Korean and Japanese—a methodological study." Proceedings of the 11th coference on Computational linguistics. Association for Computational Linguistics, Aug. 1986, pp. 325-328.*

Liu, Haitao. "Dependency distance as a metric of language comprehension difficulty." Journal of Cognitive Science 9.2, Dec. 2008, pp. 159-191.*

Dillinger, An Introduction to Machine Translation. Translation Optimization Partners, 2010.

Hutchins, Machine Translation and Computer-Based Translation Tools: What's Available and How It's Used. Edited transcript of a presentation at the University of Valladolid (Spain) in Mar. 2003.

Dyvik, On the Complexity of Translation, Department of Linguistics and Comparative Literature, Section for Linguistic Studies, University of Bergen, Hilde Hasselgard and Signe Oksefjell (eds.): Out of Corpora.Studied in Honour of Stig Johansson, pp. 215-230. Amsterdam: Rodopi (1999).

Trusted Translations. http://www.trustedtranslations.com/translation-company/translation-rates.asp downloaded Nov. 14, 2012.

* cited by examiner

DOCUMENT DECOMPOSITION INTO PARTS BASED UPON TRANSLATION COMPLEXITY FOR TRANSLATION ASSIGNMENT AND EXECUTION

FIELD OF THE INVENTION

Embodiments of the invention generally relate to information technology, and, more particularly, to human language translation technology.

BACKGROUND

Translation of documents as a service can be time-consuming and include challenging accuracy and formatting requirements. Accordingly, there exists a need to improve translation services via reducing overall turn-around time and cost, reducing variability in addition to time and cost, and increasing utilization of translators. Specifically, needs exist to more effectively utilize heterogeneity in translators' skills as well as heterogeneity in document complexity within and across documents. Similarly, there also exists a need to improve the skill set of translators and reduce translator boredom and fatigue, thus reducing errors and increasing accuracy.

SUMMARY

In one aspect of the present invention, techniques for translation decomposition and execution are provided. An exemplary computer-implemented method for document translation can include steps of decomposing a document associated with a document translation request into two or more document parts based on meta-data of the document and content of the document, estimating translation complexity between a source language and a target language for each of the two or more document parts, classifying the two or more document parts based on the estimated translation complexity of each part and meta-data corresponding to each part, assigning each of the two or more document parts to a particular individual amongst a set of translators for translation based on the classification of each part and one or more variables associated with the set of translators, assembling each translation output for the two or more document parts to form a final output, and formatting the final output. The same technique can be extended to multiple documents in a translation request. Also, a translation request can additionally include tasks of translation, pre-processing steps (such as format conversion), figure extraction and post-processing steps (such as formatting, verification, etc.).

In another aspect of the invention, an exemplary computer-implemented method for document translation can include steps of classifying each of multiple documents identified in a translation request into two or more classification categories based on the content of each document, and decomposing each of the multiple documents into multiple individual document parts based on the classification category associated with each document. The method can also include measuring complexity of translation between a source language and a target language for each individual document part of each of the multiple documents, assigning each individual document part to a particular individual amongst a set of individuals for translation based on the complexity of translation for each document part and one or more variables of the set of individuals, assembling and formatting the multiple individual document parts of each of the multiple documents, post-translation, into a document collection.

Another aspect of the invention or elements thereof can be implemented in the form of an article of manufacture tangibly embodying computer readable instructions which, when implemented, cause a computer to carry out a plurality of method steps, as described herein.

Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
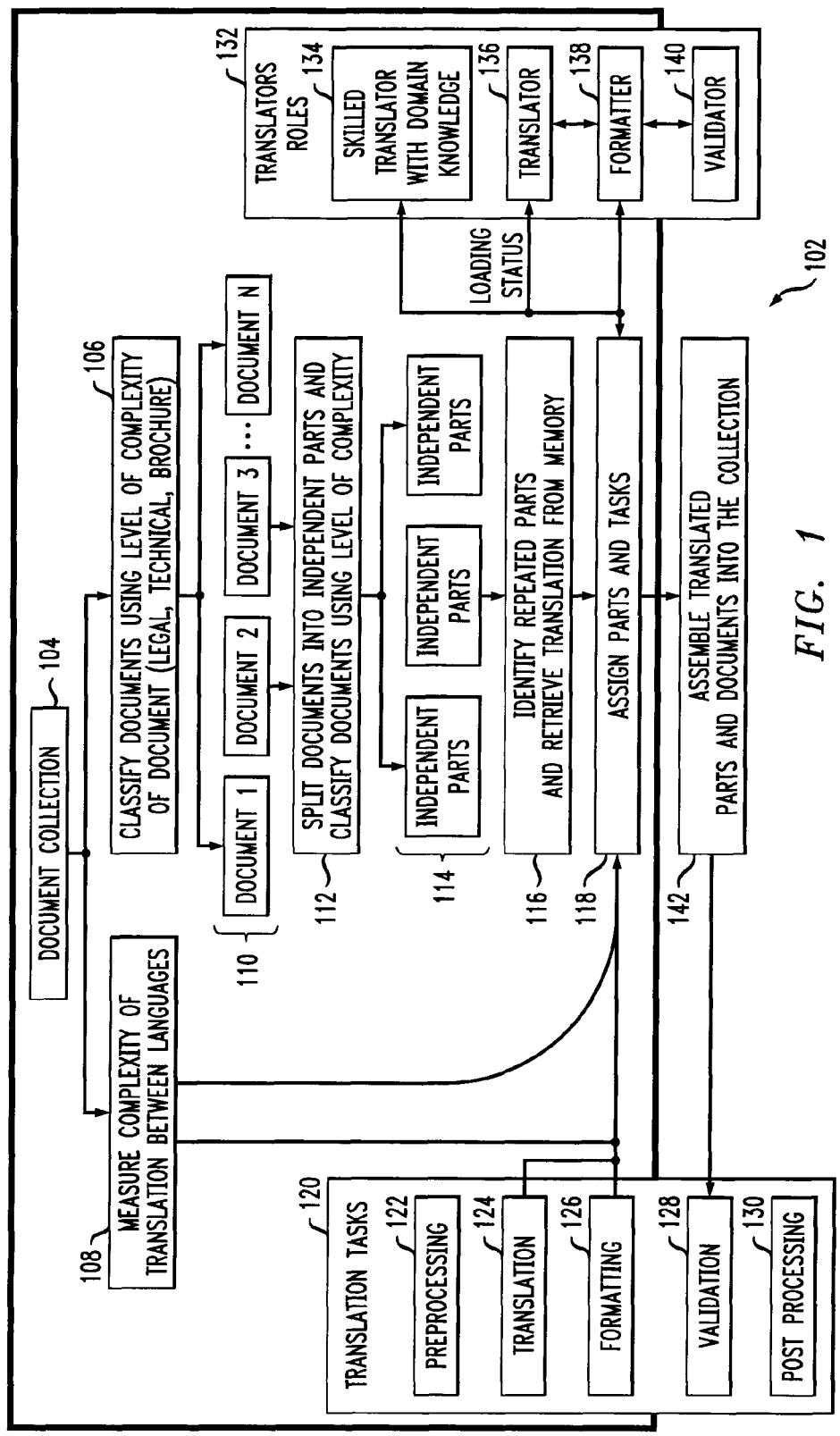
FIG. 1 is a block diagram illustrating an example embodiment, according to an aspect of the invention.

As described herein, an aspect of the present invention includes machine translation (MT) and computer-based translation tools. At least one embodiment of the invention includes using MT tools interactively to translate, assemble and format a document, as well as review the entire document.

MT tools are useful because there can be large amounts of material that need to be translated, and human translators often cannot feasibly handle the entirety of such material. Also, technical materials can be dense and/or repetitive, potentially leading to fatigue of human translators. Additionally, there can often be a requirement that terminology is used consistently throughout translations, and MT tools can be useful in achieving this objective. The use of computer-based translation tools can also increase the volume and speed of translation throughput. However, as computers do not always produce satisfactory translations, aspects of the invention include providing and implementing interactive MT tools.

Additionally, as detailed herein, at least one embodiment of the invention includes analyzing the complexity of translation relation between source and target languages to determine the extent to which the translation can be performed automatically, and to what extent the translation would be more effectively carried out by a human translator with a particular skill level. By way of example, the complexity of the source language grammar rules and the target language grammar rules can be estimated, and Kullback-Leibler (KL) divergence can be used to provide a measure of the difference of complexity.

Also, an aspect of the invention includes analyzing complexity of a source document during consideration for the translation of documents. For example, a basic letter with non-technical terms can be translated more easily than a technical scientific paper, medical text, complex legal contract, software manual, etc. Documents (that is, documents to be translated) can be classified by complexity. Similarly, parts of a single document (for example, sections, paragraphs, or sentences) can be classified by complexity as well. Besides this classification that may be based on meta-data and service requirements (for example, turn-around time, security/privacy policies), document content can also be used to categorize the document and/or one or more portions thereof. Also, at least one embodiment of the invention can further include compression of documents, for example, beyond a simple word count. Based on compression results and a benchmark, a document or portions thereof can be categorized on a scale from easy to hard.

Further, as described herein, a document can be decomposed into parts or portions based on contextual independence, complexity and/or size of the parts/portions. In at least one embodiment of the invention, dividing the document into contextually independent parts includes generating a graph of a document, where each node is a paragraph (or a section), and there is a link between two nodes if those paragraphs have common keywords. Any standard graph partitioning method can be used to partition the graph into disjoint sets of paragraphs or sections.

As such, entire documents and/or parts of documents, as well as processes (such as translating, formatting, and reviewing) and/or parts of processes can be assigned to different translators in an effort to optimize time and cost parameters (for example, typically reviewers are most expensive, and formatting cost is least expensive). Such partitioned assignments can be based on projected turn-around time (that is, execution time for completing the task), where turn-around time is the sum of translation time, formatting time, and reviewing time. Additionally, the assignments can be based on translator skill and availability, as well as on the processing rate corresponding to the document and/or document part. Further, assignments can also be based on the role of a particular translator in the overall process, where roles can include translator, editor, formatting specialist, reviewer, etc.

Also, in at least one embodiment of the invention, the document and/or portions thereof can be assigned to different translators based additionally on considerations of heterogeneity of document part type for each translator in an effort to, for example, reduce monotony for translators and build the skill levels of translators.

Decomposing and assigning/distributing documents and/or portions of documents to different individuals in a set of translators can also be based on considerations of workload balancing among translators, as well as incorporating multiple translation styles for each document.

At least one embodiment of the invention can additionally include implementation of a pull mode, wherein translators can "pull" or retrieve particular documents and/or particular parts of a document for execution. Pull mode can be effective, for example, when the variance in the translation complexity estimation is large (for example, greater than a pre-determined threshold); that is, when there exists uncertainty with respect to how much effort and/or time is needed to translate a document or a particular portion thereof. Pull mode includes identifying repeated portions within each document and retrieving a translation (if available) for such repeated portions from a memory or database. By way of example, the documents and portions thereof can be stored in an online database, along with corresponding meta-data and categorization information. A translator can retrieve a document or a portion thereof from this database even if the document or portion has not been assigned to him/her if the translator determines that he/she can complete the job more efficiently than otherwise determined.

FIG. 1 is a block diagram illustrating an example embodiment, according to an aspect of the invention. By way of illustration, FIG. 1 depicts translation analysis and decomposition system 102, which includes various components and functions as described below.

As illustrated, function 104 includes identifying documents for translation in a document collection. The complexity of the requested translation between two or more identified languages is measured in step 108, while the collected documents are classified in step 106 based on an identified level of complexity of the document (for example, a simple letter, a technical paper, a legal contract). The classified documents 110 are identified accordingly and split or decomposed into individual parts or portions in step 112. The individual portions 114 of each document can be classified using a level of complexity associated with each individual portion.

Further, step 116 includes identifying repeated portions within each document and retrieving a translation (if available) for such repeated portions from a memory or database. Step 118 includes assigning particular document parts as well as service tasks to various individual translators based on available translation tasks 120 and translator roles 132. In the example embodiment of the invention depicted in FIG. 1, translation tasks 120 considered in step 116 include pre-processing 122, translation 124 and formatting 126. Formatting of documents can include ensuring that correct margins and/or correct fonts are used, as well as ensuring that special characters including language and/or geography specific language, pictures, and/or tables are laid out correctly, etc. Preprocessing can include tasks such as converting to a particular type of document (DOC to PDF, etc.), extracting figures/tables, determining skill level for a group of available translators, and understanding translation requirements.

Additionally, translator roles 132 include a skilled translator with domain knowledge 134, a translator 136, a formatter 138 and a validator 140. By way of example, the difference between skilled translator 134 and translator 136 can include the difference in corresponding skill set with respect to the translation task in hand.

Once the document parts and service tasks have been assigned in step 118, step 142 includes assembling the translated portions and documents into the document collection. This can additionally include input and/or interaction with validation 128 and post-processing 130 tasks. Validation can include checking whether the translation is correct, and post-processing can include confirming that the document meets any requirements, and performing any clean-up actions (if required).

Figure 2:
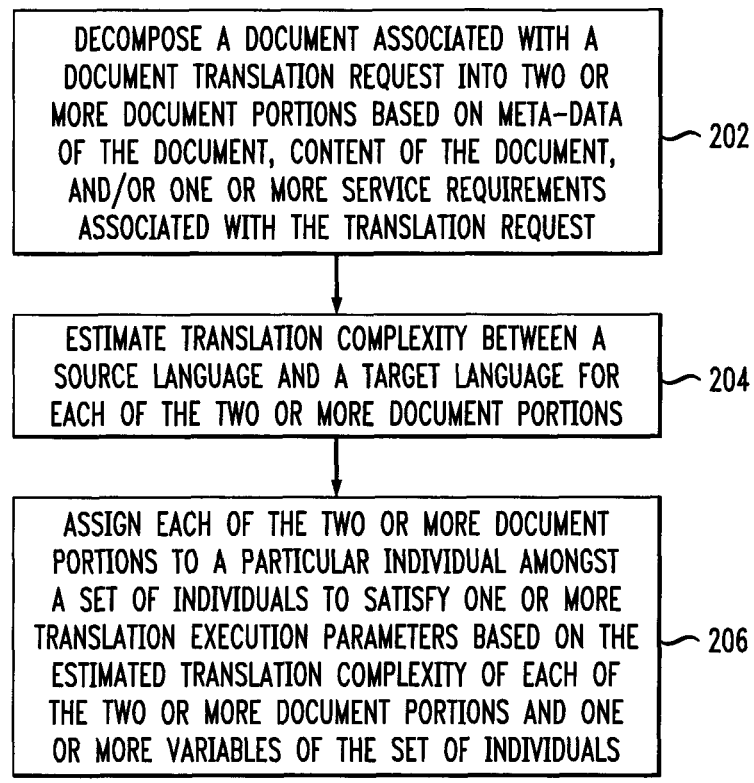
FIG. 2 is a flow diagram illustrating techniques for document translation, according to an embodiment of the invention.

FIG. 2 is a flow diagram illustrating techniques for document translation, according to an embodiment of the present invention. Step 202 includes decomposing a document associated with a document translation request into two or more document parts based on meta-data of the document and content of the document. Content of the document can include, for example, contextually independent portions of the document, as well as size of the document. Also, service requirements associated with the translation request can include, for example, completion time as well as a security and/or privacy policy.

Step 204 includes estimating translation complexity between a source language and a target language. Estimating translation complexity can include determining the extent to which the translation request can be executed automatically, and the extent to which the translation request is to be executed by an individual. Also, estimating translation complexity can include analyzing complexity of grammar rules for the source language and the target language, and using a divergence measure to quantify a difference in the complexity of grammar rules between the source language and the target language. Further, estimating translation complexity can include estimating a processing rate corresponding to each document part.

Step 206 includes assigning each of the two or more document parts to a particular individual amongst a set of translators for translation. As also described herein, translation execution parameters can include, for example, execution time and/or execution cost. Additionally, variables of the set of individuals can include, for example, skill and/or availability of each individual in the set of individuals/translators, as well as heterogeneity of document part type assigned to each individual. Variables associated with the set of translators can also include, for example, workload balance across the set of translators.

Additionally, the techniques depicted in FIG. 2 can also include classifying the two or more document parts based on complexity of each part and meta-data corresponding to each part. Further at least one embodiment of the invention includes assembling each translation output for the two or more document parts to form a final output, and formatting the final output. Also, as detailed herein, each of the steps depicted in FIG. 2, in at least one embodiment of the invention, is carried out in accordance with one or more requirements of the document translation request and one or more variables associated with the set of translators. Requirements of the document translation request can include turn-around time as well as cost.

Further, the techniques depicted in FIG. 2 can include assigning each of one or more translation tasks associated with the translation request to a particular individual amongst the set of individuals/translators to satisfy the one or more requirements of the document translation request and the one or more variables associated with the set of translators. Additionally, as detailed herein, at least one embodiment of the invention includes enabling an individual to manually retrieve a particular document part for execution of a task associated with the document translation request.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 3:
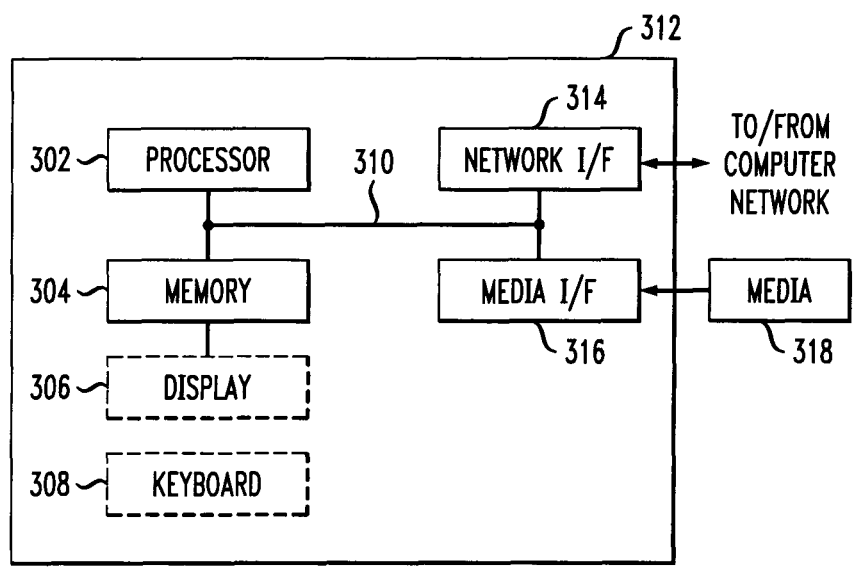
FIG. 3 is a system diagram of an exemplary computer system on which at least one embodiment of the invention can be implemented.

Additionally, an aspect of the present invention can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, automatically decomposing and distributing portions of a document to a set of translators based on the availability, skill, specialization, role and/or processing rate of the translators.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for document translation, the method comprising steps of:

decomposing a document associated with a document translation request into two or more document parts based on meta-data of the document and content of the document;

estimating translation complexity between a source language and a target language for each of the two or more document parts, wherein said estimating the translation complexity comprises (i) computing a divergence measure to quantify a difference in complexity of one or more grammar rules associated with the source language and one or more grammar rules associated with the target language, and (ii) estimating a processing rate for each of the two or more document parts;

identifying one or more of the document parts comprising a variance in the translation complexity estimation that is greater than a pre-determined threshold;

identifying one or more repeated portions of text within said identified document parts;

retrieving a stored translation for each of said repeated portions from a database;

classifying the remaining document parts based on the estimated translation complexity of each part and meta-data corresponding to each part;

assigning each respective one of the remaining document parts to one of (i) an automated machine translation module and (ii) a distinct individual amongst a set of multiple human translators for translation such that the document translation request is executed by a combination of the automated machine translation module and one or more of the multiple human translators, and wherein said assigning is based on:

(i) the classification of each of two or more document parts, (ii) required execution time for completing the document translation request, and (iii) multiple variables associated with the set of multiple human translators comprising at least translation skill level of each of the multiple human translators and availability of each of the multiple human translators;

assembling (i) the stored translation for each of said repeated portions of text within the identified document parts, and (ii) each translation output for the remaining document parts to form a final output; and formatting the final output;

wherein the steps are carried out by at least one computer device.

2. The method of claim 1, wherein said one or more variables associated with the set of translators comprises cost.

3. The method of claim 1, wherein said content of the document comprises one or more contextually independent portions of the document.

4. The method of claim 1, wherein said one or more variables associated with the set of translators comprises heterogeneity of document part type assigned to each individual.

5. The method of claim 1, wherein said one or more variables associated with the set of translators comprises workload balance across the set of translators.

6. The method of claim 1, comprising:

enabling an individual to manually retrieve a particular document part for execution of a task associated with the document translation request.

7. The method of claim 1, wherein said formatting comprises using one or more predetermined margins.

8. The method of claim 1, wherein said formatting comprises using one or more predetermined fonts.

9. The method of claim 1, wherein said formatting comprises using one or more pre-determined special characters.

10. The method of claim 1, wherein said formatting comprises using one or more pre-determined pictures.

11. The method of claim 1, wherein said formatting comprises using one or more pre-determined tables.

12. An article of manufacture comprising a non-transitory computer readable storage medium having computer readable instructions tangibly embodied thereon which, when implemented, cause a computer to carry out a plurality of method steps comprising:
 decomposing a document associated with a document translation request into two or more document parts based on meta-data of the document and content of the document;
 estimating translation complexity between a source language and a target language for each of the two or more document parts, wherein said estimating the translation complexity comprises (i) computing a divergence measure to quantify a difference in complexity of one or more grammar rules associated with the source language and one or more grammar rules associated with the target language, and (ii) estimating a processing rate for each of the two or more document parts;
 identifying one or more of the document parts comprising a variance in the translation complexity estimation that is greater than a pre-determined threshold;
 identifying one or more repeated portions of text within said identified document parts;
 retrieving a stored translation for each of said repeated portions from a database;
 classifying the remaining document parts based on the estimated translation complexity of each part and meta-data corresponding to each part;
 assigning each respective one of the remaining document parts to one of (i) an automated machine translation module and (ii) a distinct individual amongst a set of multiple human translators for translation such that the document translation request is executed by a combination of the automated machine translation module and one or more of the multiple human translators, and wherein said assigning is based on:
  (i) the classification of each of two or more document parts,
  (ii) required execution time for completing the document translation request, and
  (iii) multiple variables associated with the set of multiple human translators comprising at least translation skill level of each of the multiple human translators and availability of each of the multiple human translators;
 assembling (i) the stored translation for each of said repeated portions of text within the identified document parts, and (ii) each translation output for the remaining document parts to form a final output; and
 formatting the final output.

13. The article of manufacture of claim 12, wherein the one or more requirements of the document translation request comprises cost.

14. The article of manufacture of claim 12, wherein said one or more variables associated with the set of translators comprises heterogeneity of document part type assigned to each individual.

15. The article of manufacture of claim 12, wherein the method steps comprise:
 enabling an individual to manually retrieve a particular document part for execution of a task associated with the document translation request.

16. The article of manufacture of claim 12, wherein said one or more variables associated with the set of translators comprises workload balance across the set of translators.

17. The article of manufacture of claim 12, wherein said formatting comprises using one or more pre-determined margins, one or more pre-determined fonts, one or more pre-determined special characters, one or more pre-determined pictures and/or one or more pre-determined tables.

18. A system for document translation, comprising:
 a memory; and
 at least one processor, coupled to the memory, operative for:
  decomposing a document associated with a document translation request into two or more document parts based on meta-data of the document and content of the document;
  estimating translation complexity between a source language and a target language for each of the two or more document parts, wherein said estimating the translation complexity comprises (i) computing a divergence measure to quantify a difference in complexity of one or more grammar rules associated with the source language and one or more grammar rules associated with the target language, and (ii) estimating a processing rate for each of the two or more document parts;
  identifying one or more of the document parts comprising a variance in the translation complexity estimation that is greater than a pre-determined threshold;
  identifying one or more repeated portions of text within said identified document parts;
  retrieving a stored translation for each of said repeated portions from a database;
  classifying the remaining document parts based on the estimated translation complexity of each part and meta-data corresponding to each part;
  assigning each respective one of the remaining document parts to one of (i) an automated machine translation module and (ii) a distinct individual amongst a set of multiple human translators for translation such that the document translation request is executed by a combination of the automated machine translation module and one or more of the multiple human translators, and wherein said assigning is based on:
   (i) the classification of each of two or more document parts,
   (ii) required execution time for completing the document translation request, and
   (iii) multiple variables associated with the set of multiple human translators comprising at least translation skill level of each of the multiple human translators and availability of each of the multiple human translators;
  assembling (i) the stored translation for each of said repeated portions of text within the identified document parts, and (ii) each translation output for the remaining document parts to form a final output; and
  formatting the final output.

19. The system of claim 18, wherein said formatting comprises using one or more pre-determined margins, one or more pre-determined fonts, one or more pre-determined special characters, one or more pre-determined pictures and/or one or more pre-determined tables.

20. A method for document translation, the method comprising steps of:
classifying each of multiple documents identified in a translation request into two or more classification categories based on the content of each document;
decomposing each of the multiple documents into multiple individual document parts based on the classification category associated with each document;
measuring complexity of translation between a source language and a target language for each individual document part of each of the multiple documents, wherein said measuring the complexity of translation comprises (i) computing a divergence measure to quantify a difference in complexity of one or more grammar rules associated with the source language and one or more grammar rules associated with the target language, and (ii) estimating a processing rate for each of the multiple document parts;
identifying one or more of the document parts comprising a variance in the translation complexity estimation that is greater than a pre-determined threshold;
identifying one or more repeated portions of text within said identified document parts;
retrieving a stored translation for each of said repeated portions from a database;
assigning each respective one of the remaining document parts to one of (i) an automated machine translation module and (ii) a distinct individual amongst a set of multiple human translators for translation such that the document translation request is executed by a combination of the automated machine translation module and one or more of the multiple human translators, and wherein said assigning is based on:
(i) the complexity of translation for each document part,
(ii) required execution time for completing the document translation request, and
(iii) multiple variables of the set of multiple individuals comprising at least translation skill level of each of the multiple human translators and availability of each of the multiple human translators; and
assembling and formatting (i) the stored translation for each of said repeated portions of text within the identified document parts, and (ii) each translation output for the remaining document parts, post-translation, into a final document collection;
wherein the steps are carried out by at least one computer device.

* * * * *